(12) United States Patent
Kim (10) Patent No.: US 9,059,456 B2
(45) Date of Patent: Jun. 16, 2015

(54) RECHARGEABLE BATTERY AND BATTERY MODULE

(75) Inventor: Sung-Bae Kim, Jyunggi-do (KR)

(73) Assignees: SAMSUNG SDI CO., LTD., Yongin-si, Gyeonggi-do (KR); ROBERT BOSCH GmbH, Stuttgart (DE)

( * ) Notice: Subject to any disclaimer, the term of this patent is extended or adjusted under 35 U.S.C. 154(b) by 510 days.

(21) Appl. No.: 12/929,208

(22) Filed: Jan. 7, 2011

(65) Prior Publication Data
US 2011/0287289 A1 Nov. 24, 2011

(30) Foreign Application Priority Data

May 20, 2010 (KR) .................. 10-2010-0047713

(51) Int. Cl.
*H01M 2/32* (2006.01)
*H01M 2/30* (2006.01)

(52) U.S. Cl.
CPC ...................................... *H01M 2/30* (2013.01)

(58) Field of Classification Search
CPC ..... H01M 2/302; H01M 2/32; H01M 2/0421; H01M 2/0426
USPC .................. 429/65, 121, 170, 175, 177, 183
See application file for complete search history.

(56) References Cited

U.S. PATENT DOCUMENTS

| | | | | |
|---|---|---|---|---|
| 4,761,354 A | * | 8/1988 | Poe et al. | 429/121 |
| 5,800,942 A | * | 9/1998 | Hamada et al. | 429/148 |
| 5,977,485 A | * | 11/1999 | Yoshimura et al. | 174/138 F |
| 6,174,618 B1 | * | 1/2001 | Nishiyama et al. | 429/99 |
| 7,488,201 B2 | | 2/2009 | Yoon et al. | |
| 2001/0018147 A1 | * | 8/2001 | Yanai et al. | 429/62 |
| 2003/0068555 A1 | * | 4/2003 | Naruoka | 429/231.4 |
| 2005/0260491 A1 | * | 11/2005 | Cho | 429/178 |
| 2007/0275293 A1 | * | 11/2007 | Begg et al. | 429/53 |

FOREIGN PATENT DOCUMENTS

| | | |
|---|---|---|
| JP | 2004-022204 A | 1/2004 |
| JP | 2005-285624 A | 10/2005 |
| KR | 10-2004-0022717 A | 3/2004 |
| KR | 10-2006-0110408 A | 10/2006 |

OTHER PUBLICATIONS

Korean Office Action issued in corresponding application 10-2010-0047713, dated on Aug. 26, 2011.

* cited by examiner

*Primary Examiner* — Tracy Dove
(74) *Attorney, Agent, or Firm* — Lee & Morse, P.C.

(57) ABSTRACT

A rechargeable battery and a battery module, the rechargeable battery including an electrode assembly formed by winding a positive electrode and a negative electrode and a separator therebetween; a case accommodating the electrode assembly; a cap plate sealing an opening at one side of the case, the cap plate including a terminal hole therethrough; an electrode terminal in the terminal hole of the cap plate, the electrode terminal extending to an outside from an inside of the case and being connected to the electrode assembly; and a terminal cap including an electrical insulating material, the terminal cap covering the electrode terminal from the outside of the case.

15 Claims, 11 Drawing Sheets

RECHARGEABLE BATTERY AND BATTERY MODULE

BACKGROUND

1. Field

Embodiments relate to a rechargeable battery and a battery module.

2. Description of the Related Art

A rechargeable (secondary) battery differs from a primary battery in that it can be repeatedly charged and discharged and can be classified as a low capacity rechargeable battery or a high capacity rechargeable battery. A battery module may be formed by connecting a plurality of high-capacity secondary batteries in the form of a pack and may be used as a power supply for, e.g., driving motors in hybrid electric vehicles and the like. For example, a rechargeable battery module may be formed to have necessary power by coupling a plurality of unit batteries in series.

A unit battery, that is, a rechargeable battery, may include an electrode assembly formed in a jelly roll shape formed by winding a positive electrode and a negative electrode at both sides of a separator with the separator, a case with the electrode assembly installed therein, a cap plate sealing an opening of the case, an electrode terminal electrically connected to the electrode assembly and protruding to an outside of the cap plate through a terminal hole in the cap plate, and a lead tab respectively connecting the negative electrode and the positive electrode of the electrode assembly to the electrode terminal.

There may be an insulating structure between the electrode terminal and the terminal hole of the cap plate; and the electrode terminal may be caulked and/or welded to the lead tab from the inside of the cap plate and fixed to the terminal hole by fastening with a nut at the outside of the cap plate or may be connected to the terminal hole through a bus bar. That is, the electrode terminal may be exposed to the outside of the case in the unit battery or battery module state.

The above information disclosed in this Background section is only for enhancement of understanding of the background of the described technology and therefore it may contain information that does not form the prior art that is already known in this country to a person of ordinary skill in the art.

SUMMARY

Embodiments are directed to a rechargeable battery and a battery module, which represent advances over the related art.

It is a feature of an embodiment to provide a rechargeable battery and a battery module in which an external short-circuit of an electrode terminal at the outside of a case may be prevented.

At least one of the above and other features and advantages may be realized by providing a rechargeable battery including an electrode assembly formed by winding a positive electrode and a negative electrode and a separator therebetween; a case accommodating the electrode assembly; a cap plate sealing an opening at one side of the case, the cap plate including a terminal hole therethrough; an electrode terminal in the terminal hole of the cap plate, the electrode terminal extending to an outside from an inside of the case and being connected to the electrode assembly; and a terminal cap including an electrical insulating material, the terminal cap covering the electrode terminal from the outside of the case.

The terminal cap may include a synthetic resin or silicone.

The rechargeable battery may further include a nut outside of the cap plate and fastened to the electrode terminal, wherein the terminal cap further covers the nut.

The terminal cap may have a through-hole extending perpendicularly from a plane of an upper side of the electrode terminal.

The terminal cap may include a coupling hole connected to the through-hole, the electrode terminal being coupled to the cap plate at the coupling hole.

The terminal cap may include an expanding hole connected to the coupling hole, the expanding hole surrounding the nut.

The coupling hole may include a cut-out region, the electrode terminal being coupled to the terminal cap at the cut-out region.

The terminal cap may include an expanding hole connected to the cut-out region, the expanding hole surrounding the nut.

The cut-out region may include four cut-out planes perpendicularly crossing at a plane facing an upper end of the electrode terminal, the cut-out planes extending in a height direction of the electrode terminal.

The cut-out region may include three cut-out planes crossing at a plane facing an upper end of the electrode terminal, the cut-out planes extending in a height direction of the electrode terminal.

The terminal cap may include a grip on at least one of an upper surface and a side surface thereof.

At least one of the above and other features and advantages may also be realized by providing a battery module including a pair of rechargeable batteries neighboring each other; a bus bar connecting an electrode terminal of one of the pair of rechargeable batteries and an electrode terminal of the other one; and a terminal cap covering each electrode terminal, the terminal cap including an electrical insulating material and being coupled with the electrode terminal and the bus bar.

The terminal cap may include a through-out hole extending perpendicularly from an upper side of the electrode terminal, and a coupling hole connected to the through-hole, the electrode terminal and the bus bar being coupled to the terminal cap at the coupling hole.

The coupling hole may surround a length direction end of the bus bar and may be to open a center portion of the bus bar in the length direction.

At least one of the above and other features and advantages may also be realized by providing a terminal cap for covering an electrode terminal of a rechargeable battery, the terminal cap including a cap body, the cap body including an electrical insulating material and having an opening therein for accommodating the electrode terminal.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Korean Patent Application No. 10-2010-0047713, filed on May 20, 2010, in the Korean Intellectual Property Office, and entitled: "Rechargeable Battery and Battery Module," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

Figure 1:
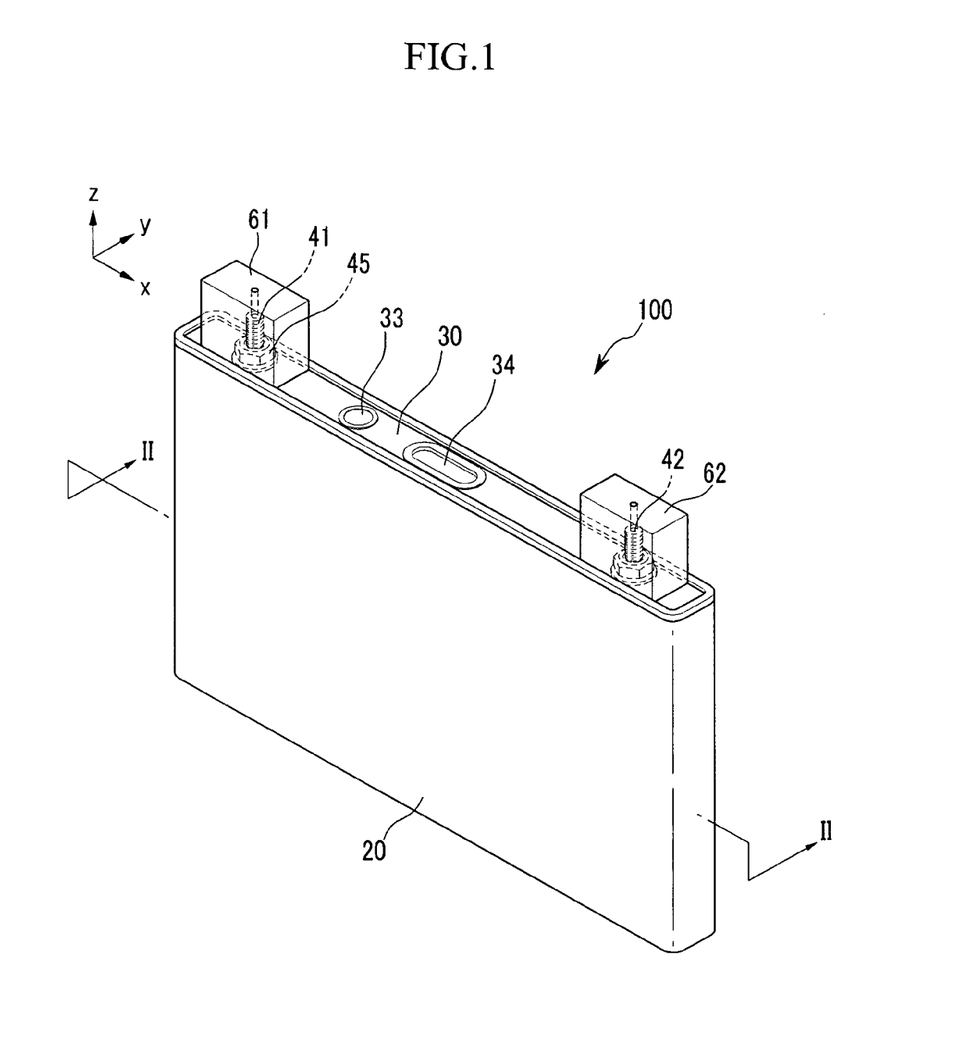
FIG. 1 illustrates a perspective view of a rechargeable battery according to an embodiment.
Figure 2:
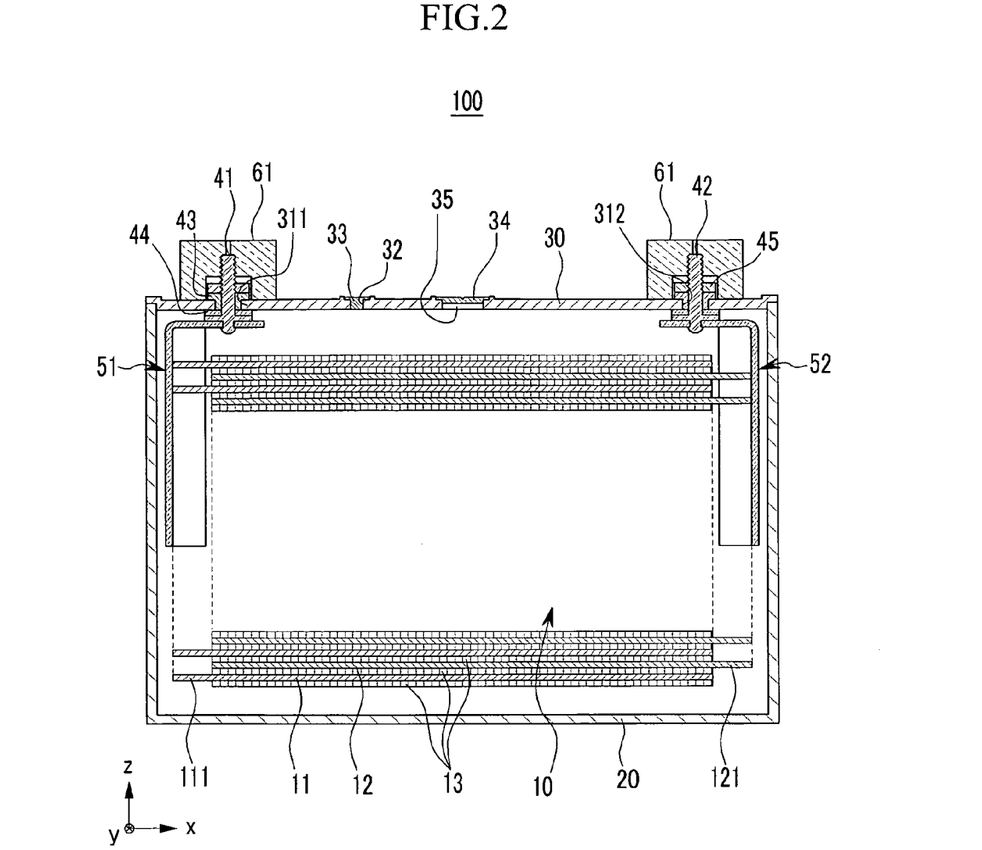
FIG. 2 illustrates a cross-sectional view of FIG. 1, taken along the line II-II.

FIG. 1 illustrates a perspective view of a rechargeable battery according an embodiment. FIG. 2 illustrates a cross-sectional view of FIG. 1, taken along the line II-II. Referring to FIG. 1 and FIG. 2, a rechargeable battery 100 may include a case 20 with an electrode assembly 10 installed therein, a cap plate 30 sealing an opening at one side of the case 20, electrode terminals 41 and 42 in respective terminal holes 311 and 312 of the cap plate 30, lead tabs 51 and 52 connecting the respective electrode terminals 41 and 42 to the electrode assembly 10, and terminal caps 61 and 62 covering the respective electrode terminals 41 and 42.

The electrode assembly 10 may include an insulating separator 13, a positive electrode 11, and a negative electrode 12. The positive and negative electrodes 11 and 12 may be respectively disposed at both sides of the separator 13. The electrode assembly 10 may be formed in a jelly roll shape by winding the positive electrode 11, the negative electrode 12, and the separator 13 together. The positive electrode 11 and the negative electrode 12 may respectively include a current collector formed from a thin metal foil and an active material coated on a surface of the current collector. In addition, the positive electrode 11 and the negative electrode 12 may be respectively partitioned into a coated region where the active material is coated on the current collector and uncoated regions 111 and 121 where the active material is not coated on the current collector. The coated region may encompass most of each area of the positive and negative electrodes 11 and 12 and the uncoated regions 111 and 112 may be formed at each side of the coated region of the electrode assembly 10 in the jelly-roll state.

The case 20 may form an entire exterior of the rechargeable battery 100. The case 20 may be made of a conductive metal, e.g., aluminum, an aluminum alloy, and/or nickel-plated steel. The case 20 may provide a space for the electrode assembly 10. In an implementation, the case 20 may be formed in a prismatic cuboid shape having an opening at one side thereof for receiving the electrode assembly 10 formed in a shape corresponding to the cuboid. The opening may be formed in the upper direction (z-axis direction in the drawing) in the case 20 shown in FIG. 1 and FIG. 2.

The cap plate 30 may be formed of a thin plate and may be coupled to the opening of the case 20 to thereby seal the case 20. The cap plate 30 and the case 20 may be internally or externally connected as desired while externally and internally blocking each other. The cap plate 30 may include constituent elements that form and facilitate operation of the rechargeable battery 100. For example, the cap plate 30 may include the terminal holes 311 and 312 through which the respective electrode terminals 41 and 42 protrude, an electrolyte solution opening 32 for injection of an electrolyte solution, and a vent hole 35 for guaranteeing safety of the rechargeable battery 100 when internal pressure is excessively increased. The electrolyte solution opening 32 may facilitate injection of the electrolyte solution into the case 20 while the cap plate 30 is coupled to the case 20. After injection of the electrolyte solution into the case 20, the electrolyte solution opening 32 may be sealed by a sealing cap 33.

The vent hole 35 may be maintained in a closed state when the rechargeable battery 100 is normally operated and may be sealed by a vent plate 34 so as to be opened only when the internal pressure is excessively increased, i.e., exceeds a predetermined pressure. That is, the vent plate 34 may be formed of a plate that is thinner than the cap plate 30 and may be welded around the vent hole 35. When the internal pressure of the case 20 increases above a predetermined level due to, e.g., charging and discharging of the electrode assembly 10, the vent plate 34 may be ruptured by the internal pressure and may emit internal gas of the rechargeable battery 100. Therefore, explosion of the rechargeable battery 100 may be prevented.

The terminal holes 311 and 312 may penetrate the cap plate 30 so as to facilitate insertion of the electrode terminals 41 and 42. That is, the electrode terminals 41 and 42 may respectively electrically connect the positive electrode 11 and the negative electrode 12 of the electrode assembly 10 through the terminal holes 311 and 312 to an exterior of the rechargeable battery 100. For example, the electrode terminals 41 and 42 may be respectively installed in the terminal holes 311 and 312 by providing an outer insulator 43 and an inner insulator 44. Thus, the outer insulator 43 and the inner insulator 44 may form an electrical insulation structure between the electrode terminals 41 and 42 and the cap plate 30. The electrode terminals 41 and 42 may be electrically connected to the electrode assembly from inside the case 20 through the terminal holes 311 and 312, and may simultaneously protrude outside the case 20.

One end of each of the lead tabs 51 and 52 may be respectively connected to the electrode terminals 41 and 42. Other ends of the lead tabs 51 and 52 may be respectively connected to the uncoated regions 111 and 121 at ends of the electrode assembly 10. That is, the lead tabs 51 and 52 may be formed with the same structure, and may respectively connect the positive electrode 11 and the negative electrode 12 to the positive electrode terminal 41 and the negative electrode terminal 42 in the same way. For convenience, an adhesion structure of the positive electrode terminal 41 and the lead tabs 51 and 52 will be exemplarily described with regard to the electrode terminal 41 and the lead tab 51 connected to the positive electrode 11.

Figure 3:
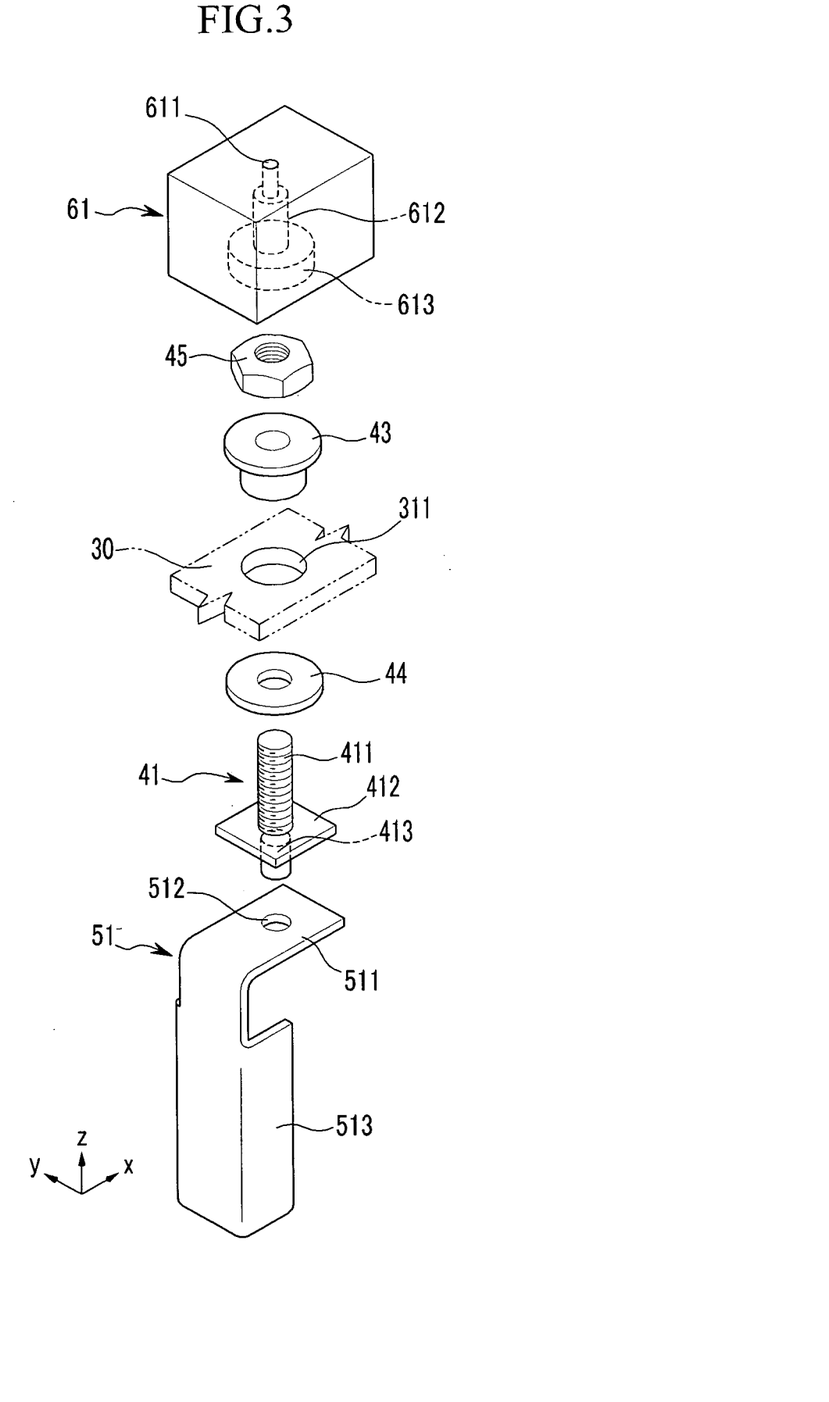
FIG. 3 illustrates an exploded perspective view of a lead tab, an electrode terminal, a cap plate, and a terminal cap of FIG. 1.
Figure 4:
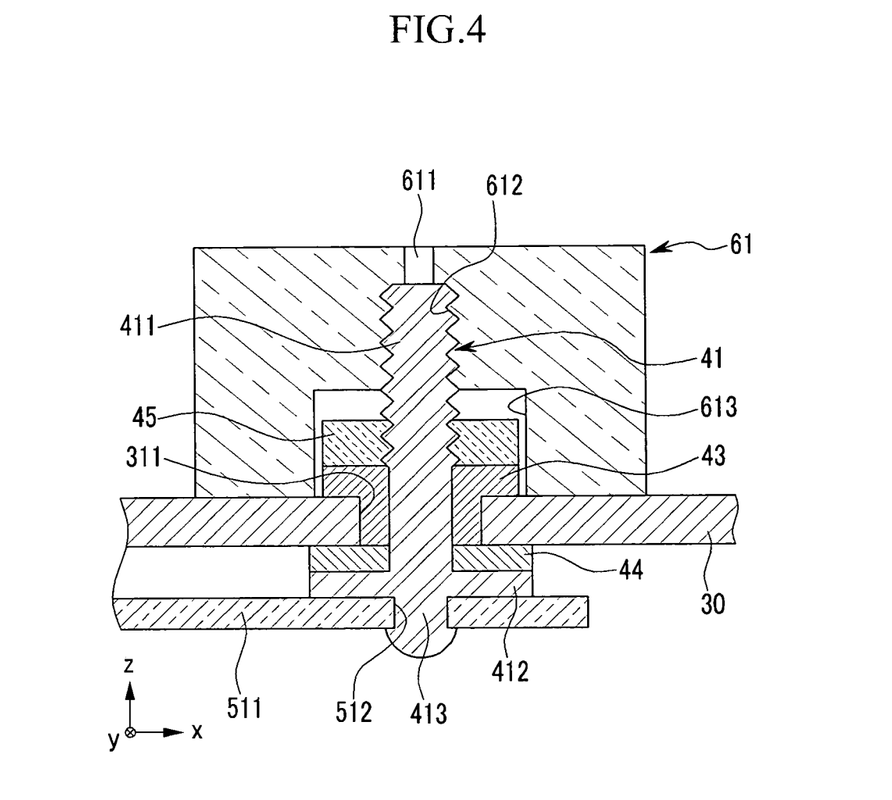
FIG. 4 illustrates a cross-sectional view of the components of FIG. 3 in an assembled state.

FIG. 3 illustrates an exploded perspective view of a lead tab, an electrode terminal, a cap plate, and a terminal cap, according to an embodiment. FIG. 4 illustrates a cross-sectional view of the elements of FIG. 3 in an assembled state. Referring to FIG. 3, the electrode terminal 41 may include a stem 411 inserted into the terminal hole 311 and protruding to an external side of the cap plate 30, a flange 412 at one side of the stem 411, and a protrusion 413 protruding to an opposite side of the stem 411 at the flange 412. The lead tab 51 may include a connecting region 511 closely connected to the flange 412 of the electrode terminal 41, a connecting hole 512 penetrating the connecting region 511 for coupling of the protrusion 413, and a current collecting region 513 extended in a perpendicular direction (z-axis direction in the drawing) from the connecting region 511 and connected to the uncoated region 111 of the electrode assembly 10.

Referring to FIG. 4, the electrode terminal 41 and the lead tab 51 may have a connection structure in which the flange 412 of the electrode terminal 41 is in surface contact with the connecting region 511 of the lead tab 51, and the protrusion 413 is coupled to the connecting hole 512 and then caulked and/or welded to connect the protrusion 413 to the connecting region 511 along the connecting hole 512. The flange 41 and the connecting region 511 may increase a contact area; and the protrusion 413 and the connecting hole 512 may increase the contact area and fastening force therebetween. Thus, an increase of electrical resistance between the electrode terminal 41 and the lead tab 51 as well as separation of an electrical connection therebetween may be prevented.

Structures of the electrode terminal 41, the lead tab 51, and the cap plate 30 are not limited to the above-stated structures. The terminal caps 61 and 62 applied to the electrode terminal 41 and the cap plate 30 of the embodiments may be applied to various types of electrode terminals and cap plates. For example, the terminal caps 61 and 62 may be applied to an electrode terminal that includes a short-circuit member electrically connecting a positive electrode and a negative electrode and a cap plate (not shown) when the internal temperature of the rechargeable battery is increased.

The terminal caps 61 and 62 of the present embodiment may be formed of an electrically insulating material and may cover the electrode terminals 41 and 42 from an outside of the case 20 so that an external short-circuit of the electrode terminals 41 and 42 may be prevented. For example, the terminal caps 61 and 62 may be formed of an electrically insulating synthetic resin or silicone. The terminal caps 61 and 62 may respectively have the same structure and may respectively cover the electrode terminals 41 and 42 with the same structure. Thus, for convenience, the electrode cap 61 covering the electrode terminal 41 at the positive electrode 11 will be exemplarily described for the structure of the terminal caps 61 and 62 covering the electrode terminals 41 and 42.

For example, the terminal cap 61 may cover the electrode terminal 41 protruding to the outside of the cap plate 30. A nut 45 may be fastened to the electrode terminal 41. In addition, when the outer insulator 43 protrudes from the external surface of the cap plate 30, the terminal cap 61 may cover the nut 45 as well as the outer insulator 43. The terminal cap 61 may have a through-hole 611 directly or perpendicularly above the electrode terminal 41. In particular, the through-hole 611 may extend perpendicularly from an upper surface of the electrode terminal 41 and may expose a portion of the electrode terminal 41. Thus, the through-hole 611 may facilitate connection of a measurement device to the electrode terminal 41 through the through-hole 611 while being covered by the terminal cap 61 and may facilitate measurement of an open circuit voltage (OCV) of the rechargeable battery 100. That is, the through-hole 611 may facilitate measurement of the OCV of the rechargeable battery 100 without any inconvenience even when the electrode terminal 41 is covered by the terminal cap 61.

When the terminal cap 61 covers the electrode terminal 41, the terminal cap 61 may have a fastening force with the terminal 41 or the nut 45 to prevent the terminal cap 61 from being detached from the electrode terminal 41. Accordingly, the terminal cap 61 may have a coupling hole 612 connected to the through-hole 611. In particular, the electrode terminal 41 may be coupled to the terminal cap at the coupling hole 612. Threads may be formed in the stem 411 of the electrode terminal 41. Thus, when the terminal cap 61 covers the electrode terminal 41, the stem 411 of the electrode terminal 41 may be inserted into the coupling hole 612 of the terminal cap 61 such that an inner surface of the coupling hole 612 is partially deformed. Due to the deformation, the coupling hole 612 and the stem 411 may have a fastening force therebetween. That is, the terminal cap 61 may cover the electrode terminal 41 while having the fastening force to thereby electrically insulate the electrode terminal 41 from the outside.

In addition, the terminal cap 61 may have an expanding hole 613 connected to the coupling hole 612. The expanding hole 613 may surround the nut 45. When the fastening force between the coupling hole 612 and the stem 411 is sufficient to maintain the terminal cap 61 in the electrode terminal 41, the expanding hole 613 may not have a fastening force with the nut 45 by having a gap with the nut 45. In this case, the terminal cap 61 may be easily fastened to the electrode terminal 41. When the coupling hole 612 and the stem 411 do not have a sufficient fastening force, the expanding hole 613 may not have a gap with the inserted nut 45 and thus it may be partially deformed by the nut 45, thereby having a fastening force.

Hereinafter, other embodiments will be described. Repeated description of parts that are similar to or the same as those of the previous embodiment will be omitted.

Figure 5:
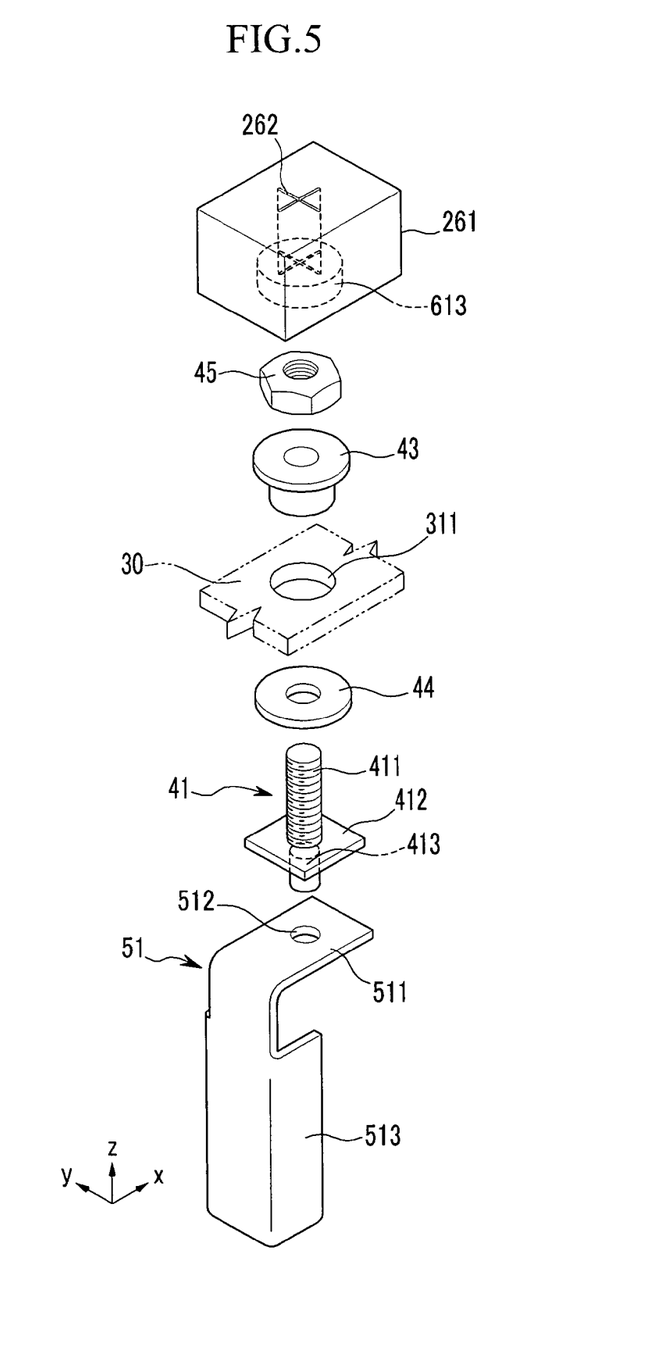
FIG. 5 illustrates an exploded perspective view of a lead tab, an electrode terminal, a cap plate, and a terminal cap of a rechargeable battery according to another embodiment.
Figure 6:
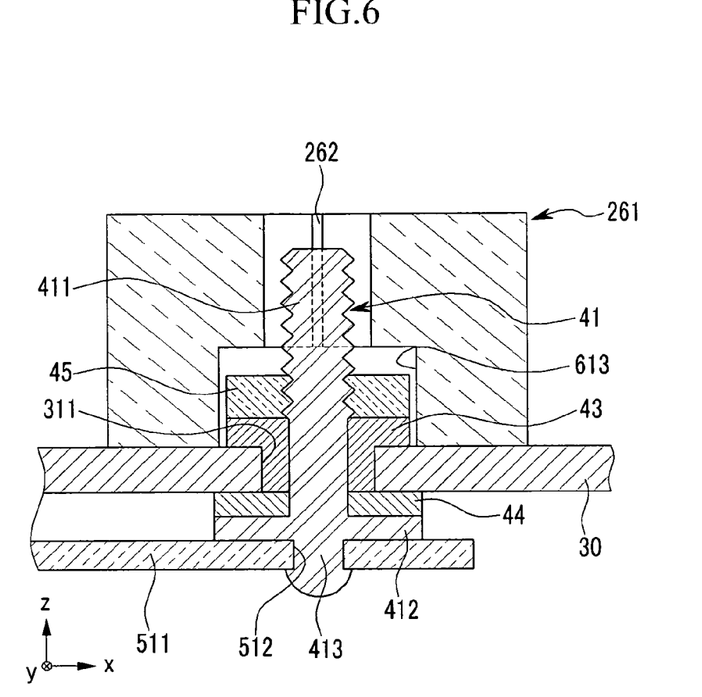
FIG. 6 illustrates a cross-sectional view of the components of FIG. 5 in an assembled state.

FIG. 5 illustrates an exploded perspective view of a lead tab, an electrode terminal, a cap plate, and a terminal cap of a rechargeable battery according to another embodiment. FIG. 6 illustrates a cross-sectional view of FIG. 5 in the assembled state.

Referring to FIG. 5 and FIG. 6, in the rechargeable battery according to the present embodiment, a terminal cap 261 may have a cut-out region 262 that is cut out so as to be coupled to the electrode terminal 41. When the electrode terminal 41 is covered by the terminal cap 261, the stem 411 of the electrode terminal 41 may be inserted into the cut-out region 262 and thus may have a fastening force therewith. That is, the cut-out region 262 may be formed as various structures to be coupled with the stem 411 and may maintain the fastened state with the stem 411 through, e.g., deformation or elastic force.

For example, in the present embodiment, the cut-out region 262 of the terminal cap 261 may have a structure that is cut into four cut-out planes perpendicularly crossing at a plane surface facing an upper end of the electrode terminal 41 and extending in a height direction of the electrode terminal 41. That is, the cut-out region 262 may cut to be formed in the shape of "+" at an upper plane of the terminal cap 261 so as to receive the stem 411 while being opened. An expanding hole 613 in the terminal cap 261 may be connected to the cut-out region 262 and may surround the nut 45. In addition, the cut-out region 262 may facilitate measurement of an open circuit voltage (OCV) of the rechargeable battery through the electrode terminal 41 while being covered by the terminal cap 261.

Figure 7:
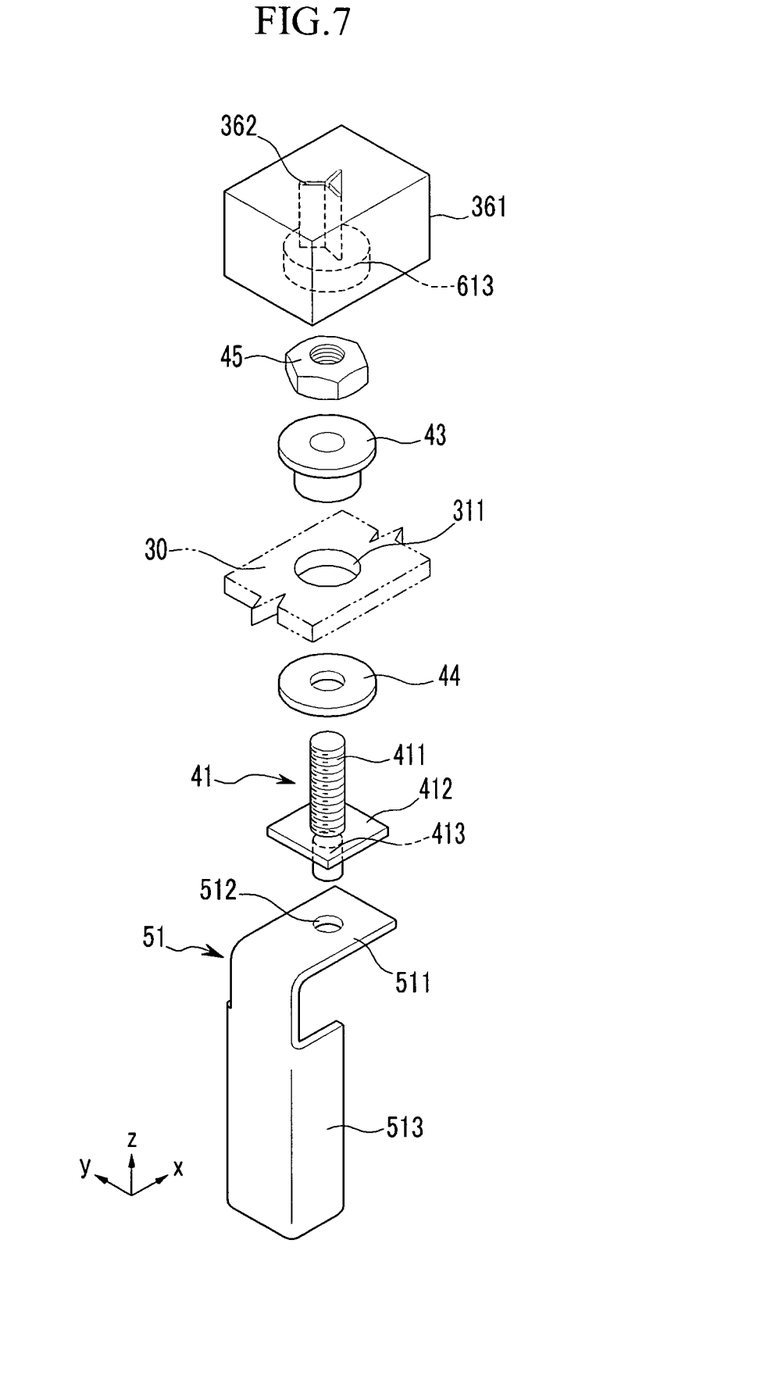
FIG. 7 illustrates an exploded perspective view of a lead tab, an electrode terminal, a cap plate, and a terminal cap of a rechargeable battery according to yet another embodiment.
Figure 8:
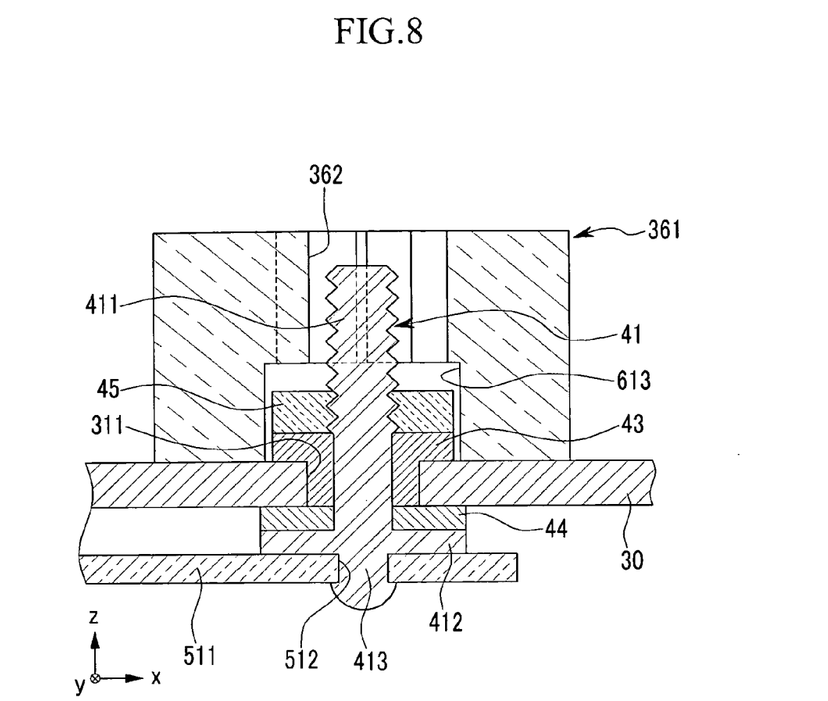
FIG. 8 illustrates a cross-sectional view of the components of FIG. 7 in an assembled state.

FIG. 7 illustrates an exploded perspective view of a lead tab, an electrode terminal, a cap plate, and a terminal cap of a rechargeable battery according to yet another embodiment. FIG. 8 illustrates a cross-sectional view of FIG. 7 in the assembled state. Referring to FIG. 7 and FIG. 8, in the rechargeable battery of the present embodiment, a cut-out region 362 may be cut into three cut-out cross-sections or planes perpendicularly crossing at a plane surface facing the upper end of the electrode terminal 41 and extending in the height direction of the electrode terminal 41.

That is, the cut-out region 362 may be formed in the shape of a "Y" at an upper plane of a terminal cap 361 so as to receive the stem 411 inserted thereto while being opened. In the terminal cap 361, an expanding hole 613 may be connected to the cut-out region 362 and may surround the nut 45. In addition, the cut-out region 362 may facilitate measurement of an open circuit voltage (OCV) of the rechargeable battery through the electrode terminal 41 while being covered by the terminal cap 361. The embodiments exemplarily show that the cut-out regions 262 and 362 may have various shapes. In an implementation, a cut-out region of a terminal cap may be formed of six or more cut-out planes (not shown).

Figure 9:
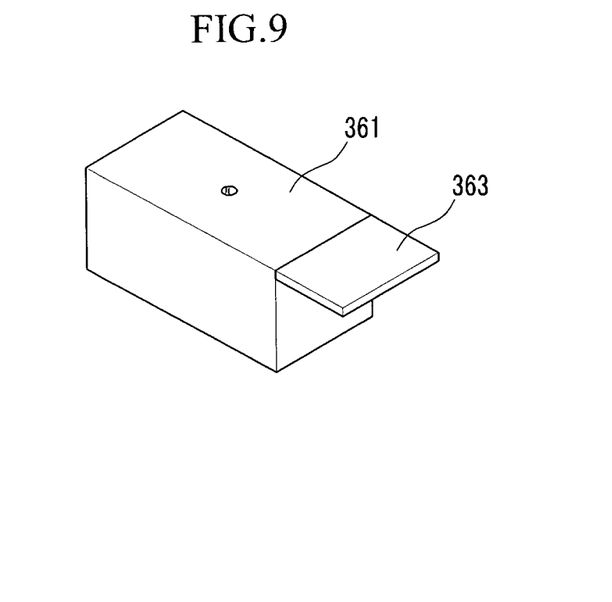
FIG. 9 illustrates a perspective view of a terminal cap of a rechargeable battery according to still another embodiment.
Figure 10:
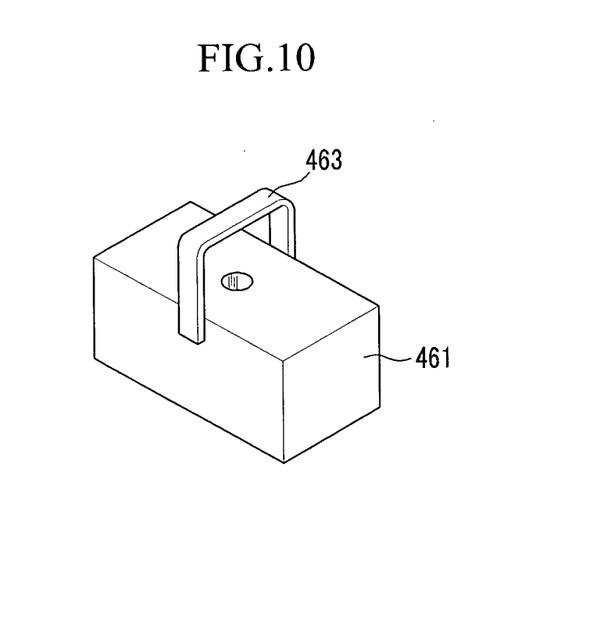
FIG. 10 illustrates a perspective view of a terminal cap of a rechargeable battery according to still another embodiment of the present invention.

FIG. 9 illustrates a perspective view of a terminal cap of a rechargeable battery according to still another embodiment. FIG. 10 illustrates a perspective view of a terminal cap of a rechargeable battery according to still another embodiment. Referring to FIG. 9, a terminal cap 361 may have a grip 363 at a side surface thereof. Referring to FIG. 10, a terminal cap 461 may have a grip 463 at an upper plane or upper surface thereof.

Covering a terminal electrode 41 with the terminal caps 361 and 461 and separating the terminal caps 361 and 461 from the electrode terminal may be performed by using the grips 363 and 463. The location and structure of the grips 363 and 463 of the present embodiments may be variously modified to exemplarily show ease in treatment of the terminal cap.

In the aforementioned embodiments, the terminal caps 61, 62, 261, 361, and 461 may cover the electrode terminals 41 and 42 when the rechargeable battery 100 is distributed or transported in a unit cell to prevent an external short-circuit of the electrode terminals 41 and 42. The terminal caps 61, 62, 261, 361, and 461 may be eliminated or removed when a plurality of rechargeable batteries are assembled to a battery module by coupling the batteries in parallel or series.

Figure 11:
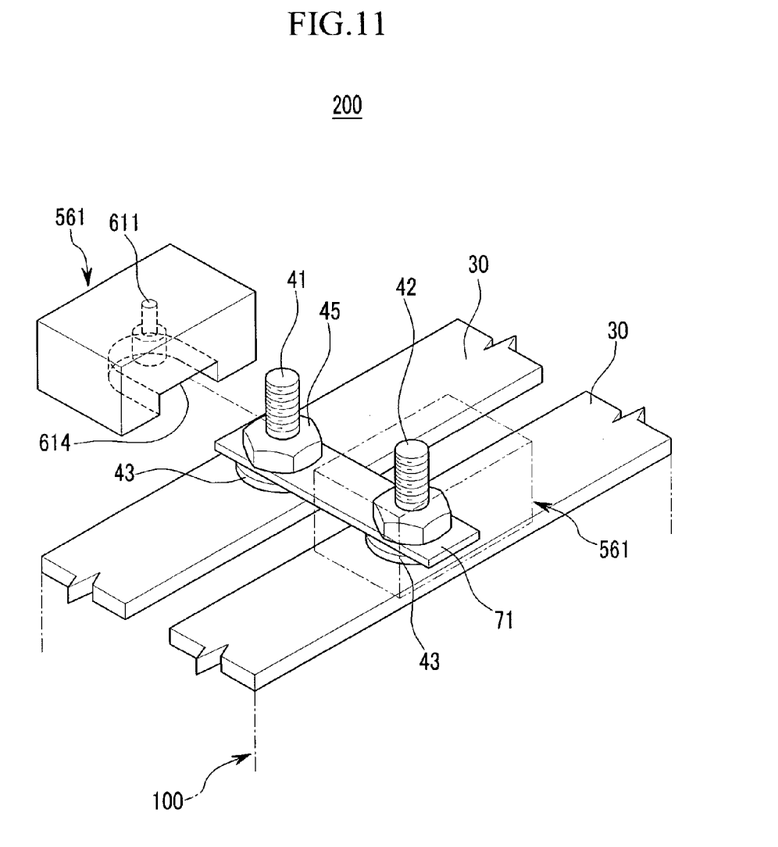
FIG. 11 illustrates a partial perspective view of a battery module according to an embodiment.
Figure 12:
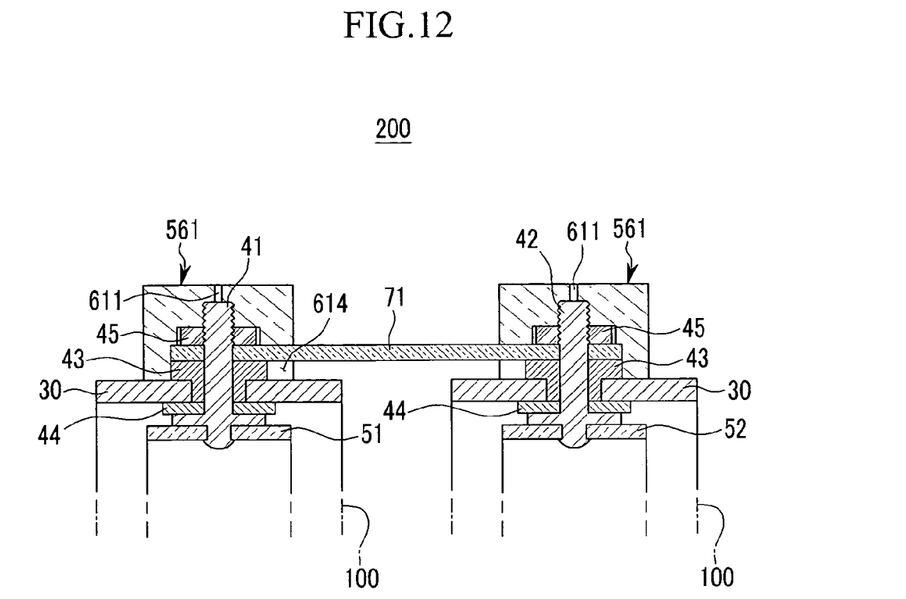
FIG. 12 illustrates a cross-sectional view of FIG. 11 in an assembled state.

FIG. 11 illustrates a partial perspective view of a battery module according to an embodiment. FIG. 12 illustrates a cross-sectional view of FIG. 11 in the assembled state. Referring to FIG. 11 and FIG. 12, a terminal cap 561 may be applied to a battery module 200 connected through a bus bar 71 according to the present embodiment. That is, the battery module 200 according to the present embodiment may include a bus bar 71 and a terminal cap 561. The bus bar 71 may connect an electrode terminal 41 of one of a pair of rechargeable batteries neighboring each other with an electrode terminal 42 of the other one, and the terminal cap 561 may cover the electrode terminal 41 and the bus bar 71. In the present embodiment, the neighboring electrode terminals 41 and 42 of the rechargeable battery 100 may be coupled in series for convenience of description.

The terminal cap 561 may have a through-hole 611 perpendicularly above the electrode terminals 41 and 42 and may have a coupling hole 614 connected to the through-hole 611. The coupling hole 614 may be coupled to the electrode terminals 41 and 42 and the bus bar 71. The coupling hole 614 may be formed by surrounding a length direction end of the bus bar 71 and opening a center portion of the bus bar 71 in the length direction, and may respectively cover at least one of the electrode terminals 41 and 42 connected to the bus bar 71. That is, the terminal cap 561 may prevent an external short-circuit of the electrode terminals 41 and 42 of each rechargeable battery 100 in a module state, that is, in the battery module 200. In addition, when the rechargeable battery 100 is distributed or transported as a unit cell, the terminal cap 561 may be used to cover the electrode terminals 41 and 42.

As described above, according to the embodiments, an external short-circuit of an electrode terminal may be prevented by covering the electrode terminal with a terminal cap. In a rechargeable battery in a unit cell, an external short-circuit of the electrode assembly that may occur during, e.g., distribution or transportation, may be prevented by covering the electrode terminal with the terminal cap. Similarly, in a battery module, an external short-circuit of an electrode terminal of a battery module that may occur when the battery module is used in, e.g., a hybrid electric vehicle, in the battery module state may be prevented by covering the electrode terminal and a part of a bus bar with a terminal cap according to an embodiment.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A rechargeable battery, comprising:
    an electrode assembly formed by winding a positive electrode and a negative electrode and a separator therebetween;
    a case accommodating the electrode assembly;
    a cap plate sealing an opening at one side of the case, the cap plate including a terminal hole therethrough;
    an electrode terminal in the terminal hole of the cap plate, the electrode terminal extending to an outside from an inside of the case and being connected to the electrode assembly; and
    a terminal cap including an electrical insulating material, the terminal cap covering the electrode terminal from the outside of the case,
    wherein the terminal cap has a through-hole extending perpendicularly from a plane of an upper side of the electrode terminal, the through-hole exposing only a portion of the upper side of the electrode terminal,
    wherein the through-hole is centered in the terminal cap over the electrode terminal, and
    wherein the terminal cap includes a coupling hole connected to the through-hole, the electrode terminal being coupled to the terminal cap at the coupling hole such that an outer side surface of the electrode terminal directly contacts the terminal cap at an inner side surface of the coupling hole.

2. The rechargeable battery as claimed in claim 1, wherein the terminal cap includes a synthetic resin or silicone.

3. The rechargeable battery as claimed in claim 1, further comprising a nut outside of the cap plate and fastened to the electrode terminal, wherein the terminal cap further covers the nut.

4. The rechargeable battery as claimed in claim 1, wherein the terminal cap includes an expanding hole connected to the coupling hole, the expanding hole surrounding a nut outside of the cap plate and fastened to the electrode terminal.

5. A rechargeable battery, comprising:
an electrode assembly formed by winding a positive electrode and a negative electrode and a separator therebetween;
a case accommodating the electrode assembly;
a cap plate sealing an opening at one side of the case, the cap plate including a terminal hole therethrough;
an electrode terminal in the terminal hole of the cap plate, the electrode terminal extending to an outside from an inside of the case and being connected to the electrode assembly; and
a terminal cap including an electrical insulating material, the terminal cap covering the electrode terminal from the outside of the case,
wherein the terminal cap includes a coupling hole, the electrode terminal being coupled to the terminal cap at the coupling hole such that an outer side surface of the electrode terminal directly contacts an inner side surface of the terminal cap at the coupling hole, and
further wherein the coupling hole includes a cut-out region, the electrode terminal being coupled to the terminal cap by at least the cut-out region.

6. The rechargeable battery as claimed in claim 5, wherein the cut-out region includes four cut-out planes perpendicularly crossing at a plane facing an upper end of the electrode terminal, the cut-out planes extending in a height direction of the electrode terminal.

7. The rechargeable battery as claimed in claim 5, wherein the cut-out region includes three cut-out planes crossing at a plane facing an upper end of the electrode terminal, the cut-out planes extending in a height direction of the electrode terminal.

8. The rechargeable battery as claimed in claim 1, wherein the terminal cap includes a grip on at least one of an upper surface and a side surface thereof.

9. A battery module, comprising:
a pair of rechargeable batteries neighboring each other;
a bus bar connecting an electrode terminal of one of the pair of rechargeable batteries and an electrode terminal of the other one; and
a terminal cap covering each electrode terminal, the terminal cap including an electrical insulating material and being coupled with the electrode terminal and the bus bar,
wherein the terminal cap includes a through-hole extending perpendicularly from a plane of an upper side of the electrode terminal, the through-hole exposing only a portion of the upper side of the electrode terminal,
wherein the through-hole is centered in the terminal cap over the electrode terminal, and
wherein the terminal cap includes a coupling hole connected to the through-hole, the electrode terminal and the bus bar being coupled to the terminal cap at the coupling hole such that an outer side surface of the electrode terminal directly contacts the terminal cap at an inner side surface of the coupling hole.

10. The battery module as claimed in claim 9, wherein the coupling hole includes a lower portion surrounding a length direction end of the bus bar and is open towards a center portion of the bus bar in the length direction.

11. The rechargeable battery as claimed in claim 1, wherein the electrode terminal is inserted into a coupling hole of the terminal cap such that an inner surface of the coupling hole is partially deformed.

12. The rechargeable battery as claimed in claim 1, wherein the terminal cap has a monolithic structure.

13. The rechargeable battery as claimed in claim 5, wherein the terminal cap includes an expanding hole connected to the cut-out region, the expanding hole surrounding a nut outside of the cap plate and fastened to the electrode terminal.

14. The rechargeable battery as claimed in claim 1, wherein a measurement device is connectable to the electrode terminal through the through-hole.

15. The rechargeable battery as claimed in claim 1, wherein the terminal cap includes a single through-hole.

* * * * *